Figure 1:
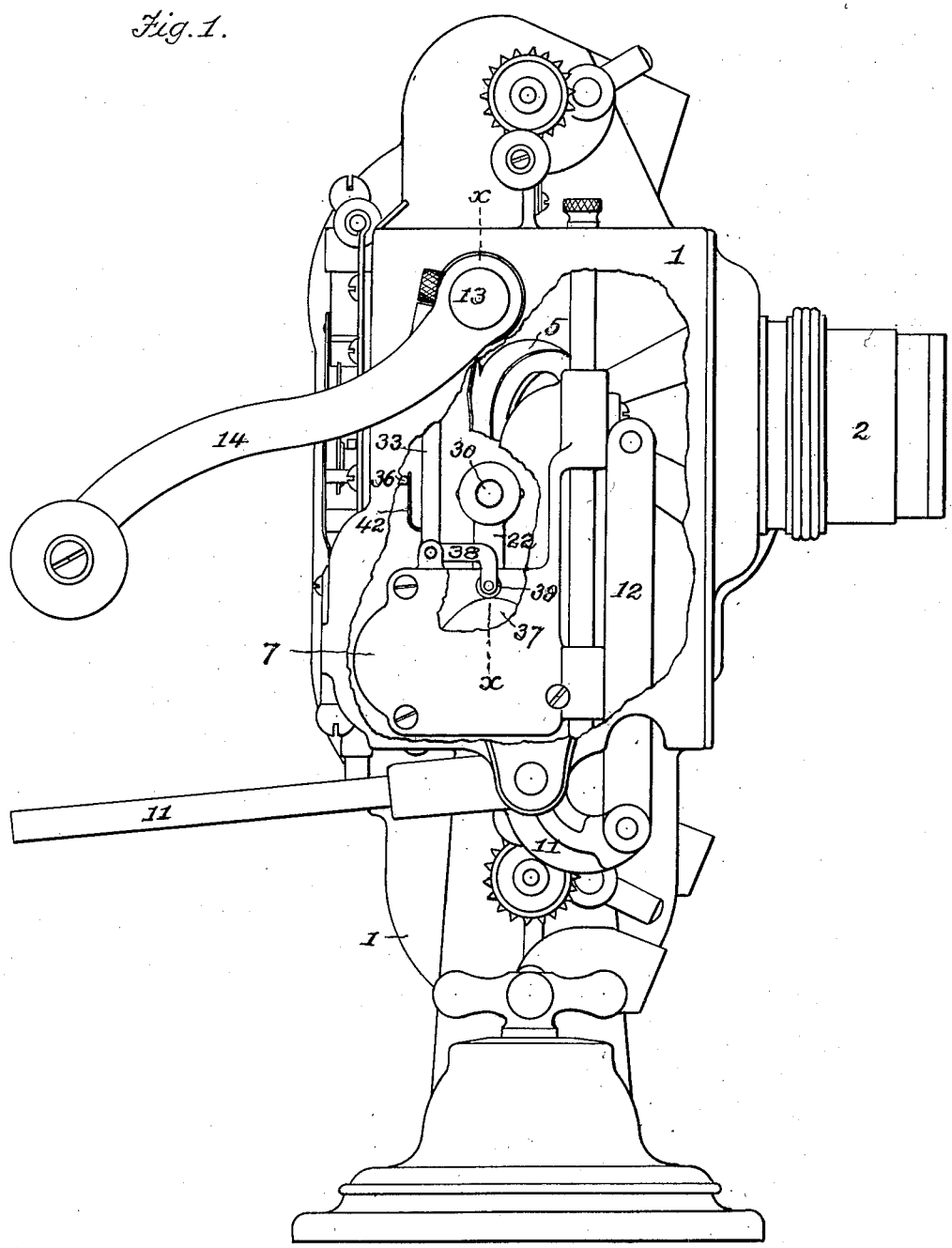

A. C. ROEBUCK.
KINETOSCOPE.
APPLICATION FILED APR. 21, 1909.

1,055,492.

Patented Mar. 11, 1913.

5 SHEETS—SHEET 1.

Attest:
M. H. Holmes
Henry Mor

Inventor:
Alvah C. Roebuck,
by Robert Burns, Atty.

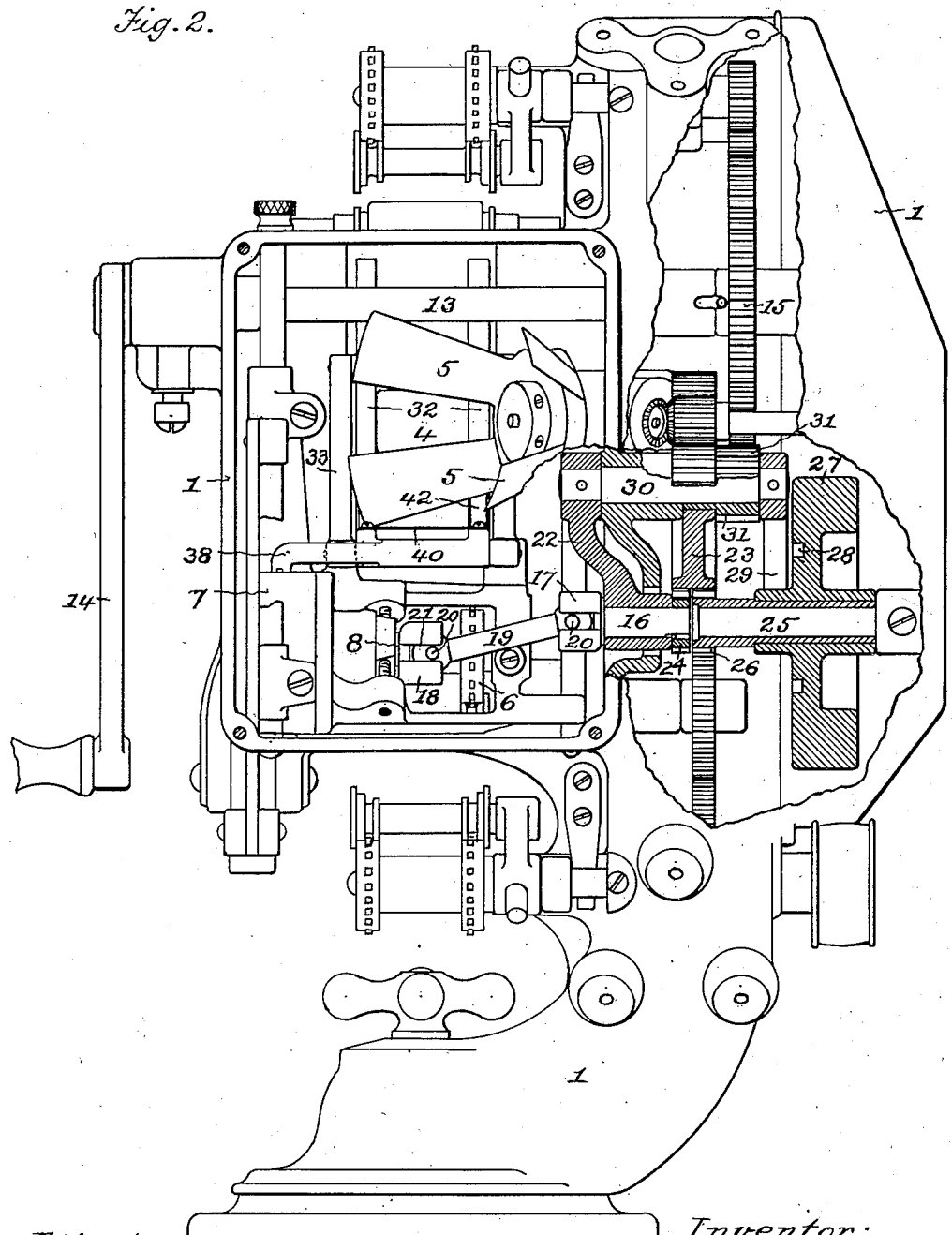

A. C. ROEBUCK.
KINETOSCOPE.
APPLICATION FILED APR. 21, 1909.
1,055,492.
Patented Mar. 11, 1913.
5 SHEETS—SHEET 3.
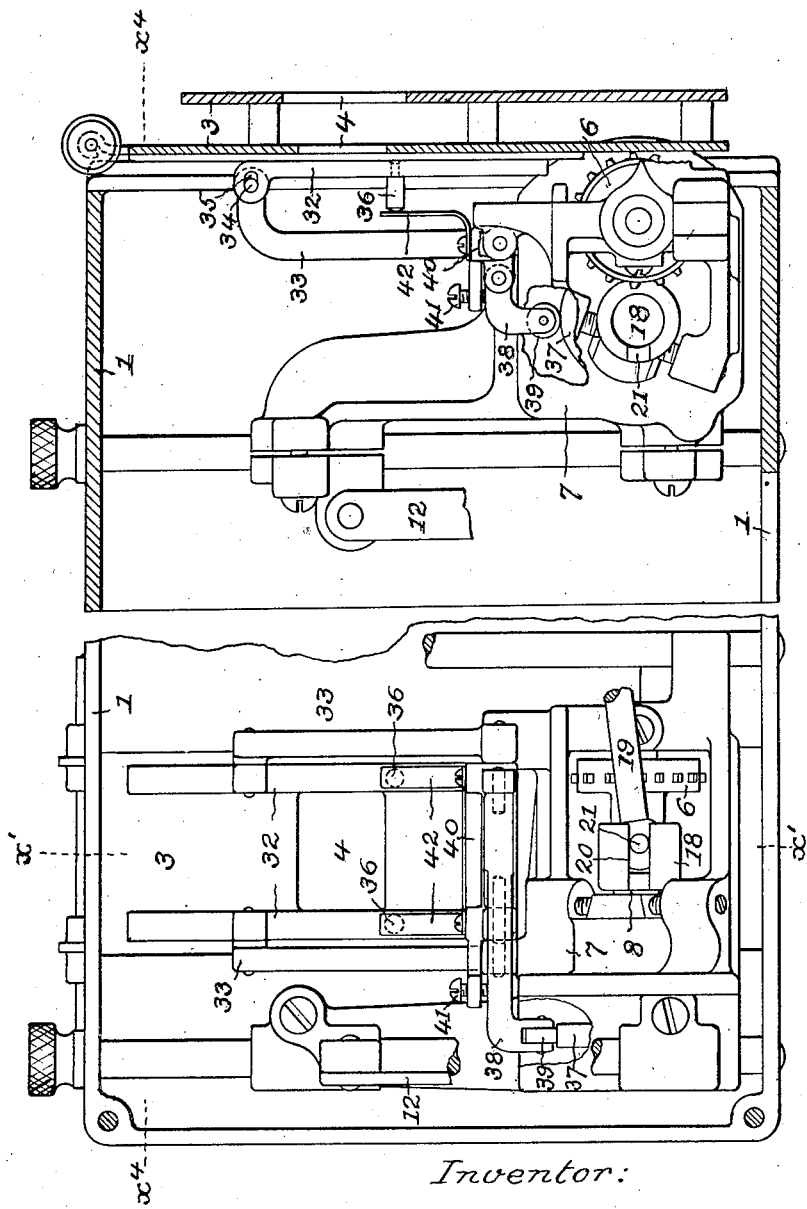
Attest:
M. H. Holmes.
Henry Moe.
Inventor:
Alvah C. Roebuck,
by Robert Burns, Atty.

A. C. ROEBUCK.
KINETOSCOPE.
APPLICATION FILED APR. 21, 1909.
1,055,492.
Patented Mar. 11, 1913.
5 SHEETS—SHEET 4.
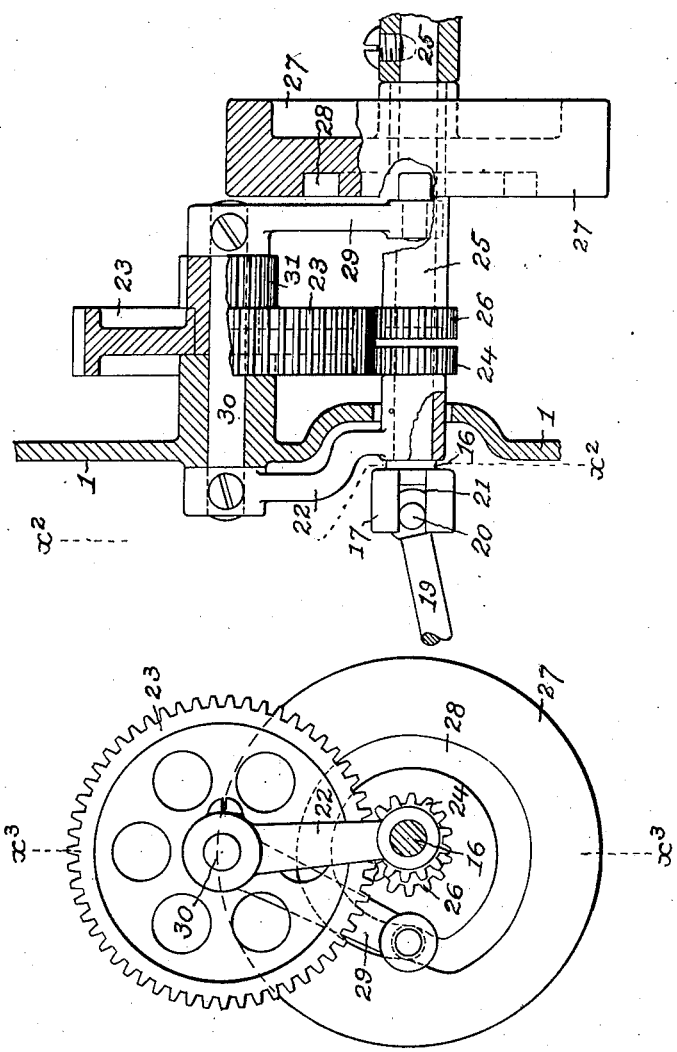
Attest:
M. H. Holmes
Henry Mos.
Inventor:
Alvah C. Roebuck,
by Robert Burns Atty.

A. C. ROEBUCK.
KINETOSCOPE.
APPLICATION FILED APR. 21, 1909.
1,055,492.
Patented Mar. 11, 1913.
5 SHEETS—SHEET 5.
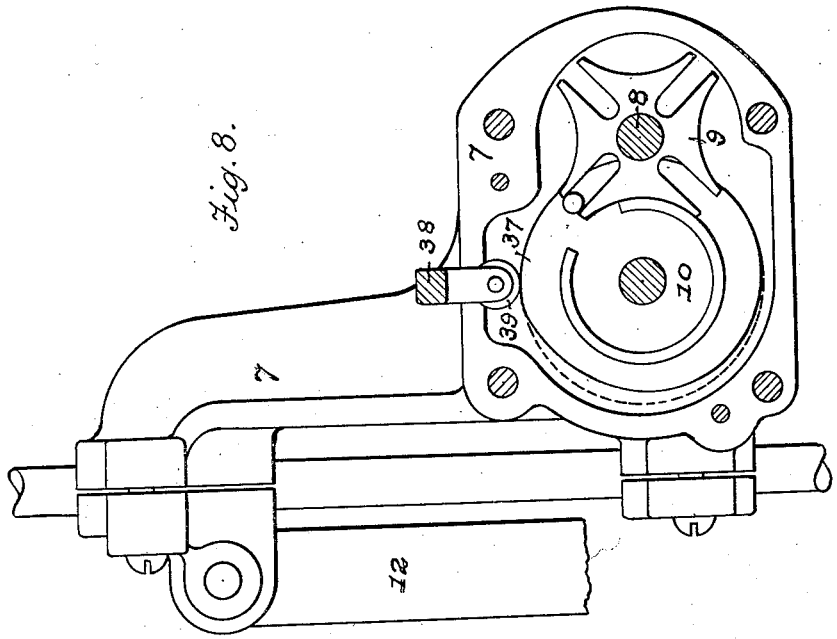
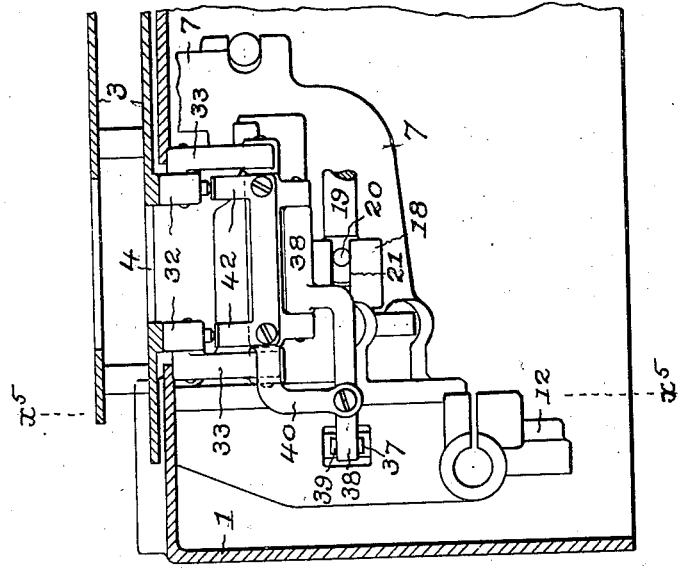
Attest:
M. H. Holmes.
Henry Moe.
Inventor:
Alvah C. Roebuck,
by Robert Burns, Atty.

UNITED STATES PATENT OFFICE.

ALVAH C. ROEBUCK, OF CHICAGO, ILLINOIS, ASSIGNOR TO THE ENTERPRISE OPTICAL MFG. COMPANY, OF CHICAGO, ILLINOIS, A CORPORATION OF ILLINOIS.

KINETOSCOPE.

1,055,492.      Specification of Letters Patent.      Patented Mar. 11, 1913.

Application filed April 21, 1909. Serial No. 491,311.

*To all whom it may concern:*

Be it known that I, ALVAH C. ROEBUCK, a citizen of the United States of America, and a resident of Chicago, in the county of Cook and State of Illinois, have invented certain new and useful Improvements in Kinetoscopes, of which the following is a specification.

This invention relates more especially to the type of kinetoscopes set forth in my prior Patent No. 939,634 dated Nov. 9, 1909, and has for its principal objects, first, to provide a simple and efficient structural arrangement of parts whereby an acceleration in the speed of the film feeding drum is attained during the period in which it is imparting intermittent feed to the film, and thus attain a relatively shorter period of the film movement and a correspondingly increased period of film rest during each cycle of the film movements. Second, to provide a simple and automatic tension mechanism for the picture film at its point of exposure, and which provides a minimum degree of tension at the beginning of the movement of the film with a view to avoid a tendency to tear the spaces between the sprocket perforations of the film and an increase in such tension after the film is in movement. Such increase in tension reaching its maximum when approximately three-fourths of the movement has taken place, and so continuing for approximately one-quarter of the cycle of the feeding mechanism to allow the film to become steady after its movement, the tension then gradually decreases until the minimum point is reached ready for a fresh cycle of the operations just described. With the described variations of the tension in the high speed feeding mechanisms of the present type, the tendency of the film to continue its movement after the feeding mechanism stops, is very effectually prevented. All as will hereinafter more fully appear.

In the accompanying drawings:—Figure 1, is a side elevation, with parts broken away, of a kinetoscope having the present improvements applied. Fig. 2, is a front elevation of the same, the lens carrying front plate being removed, and parts shown in section on line $x$—$x$, Fig. 1. Fig. 3, is a detail front elevation of the kinetoscope, the light controlling shutter and its operating mechanism being removed. Fig. 4, is a side elevation of the same with parts in section on line $x'$—$x'$, Fig. 3. Fig. 5, is a detail sectional side elevation on line $x^2$—$x^2$, Fig. 6, of the driving gearing of the film feeding mechanism. Fig. 6, is a detail sectional front elevation of the same, on line $x^3$—$x^3$, Fig. 5. Fig. 7, is a detail plan view of the film feeding and the automatic tension mechanism, on the plane $x^4$—$x^4$, Figs. 3 and 4. Fig. 8, is an enlarged detail sectional elevation on line $x^5$—$x^5$, Fig. 7.

Similar numerals of reference indicate like parts in the several views.

As represented in the drawings, the general construction will be the same as in my prior Patent No. 939,634, and will comprise an arrangement of parts as follows:

1 represents the main frame or housing provided at its front with the usual objective 2, and at its rear with a swinging door 3, on which the picture film is guided and the intermittent movement thereof effected and controlled in the manner hereinafter set forth. Such door is provided with the usual light opening or aperture 4 in symmetrical relation to optical axis of the apparatus.

5 is the light controlling shutter arranged within the housing 1 in controlling relation to the light opening 4 aforesaid, and preferably of the duplex type shown and which forms the subject matter of my prior Patent No. 909,677, dated January 12, 1909.

6 is the film feeding sprocket drum having adjacent relation to the aforesaid shutter and receiving intermittent rotation in unison with the constant rotation of said shutter by means of the connecting gearing hereinafter described. As in my prior Patent No. 939,634, the light controlling shutter has its journal axis on a fixed plane in relation to the optical axis of the apparatus, while said film feeding sprocket drum and its immediate accessories are made adjustable to and from said optical axis so that an independent adjustment of said drum and the picture film in engagement therewith can be effected with a view to properly frame the pictures upon the screen. To such end said sprocket drum has connections with the driving shaft of the kinetoscope as follows: 7 is a frame or carriage moving on suitable guide rods in vertical transverse relation to the optical axis of the kinetoscope and provided with bearings for the shaft of said sprocket drum and for a countershaft 8 which carries the driving member 9 of the pair of intermittent gears by which the continuous rotation of said countershaft imparts intermittent rotation to said sprocket drum. Such intermittent gears are preferably of the Geneva type and the driven member 10 is carried by the shaft of the sprocket drum, as shown in Fig. 8. The manual adjustment of the carriage 7 is effected by a hand lever 11, and link 12 connecting said lever with said carriage.

13, is the main driving shaft journaled transversely in the housing 1 and having at one end an operating handle 14 and at the other end the primary spur gear 15 of the trains of gears by which the different mechanisms of the kinetoscope are driven.

16 is a countershaft supported in the housing in manner hereinafter described and receiving motion from the aforesaid spur gear 15 through a series of intermediate speed increasing gears as shown in Fig. 2.

17 and 18 are knuckles or sockets carried on the opposite ends of the aforesaid shafts 8 and 16 and adapted to receive the respective ends of an intermediate connecting shaft 19. Said ends of the shaft 19 have a spherical form adapted to fit and have limited endwise movement in cylindrical cavities in the aforesaid knuckles 17, 18, and are held from independent rotation by one or more radial studs 20 moving in slots 21 in the walls of the knuckle cavities as shown in Figs. 2, 3, 4 and 7.

In the present invention, the aforesaid countershaft 16 has journal bearing in a pendulous hanger 22, pivoted in coaxial relation to the gear wheel 23 from which the pinion 24 of the said countershaft receives rotation, and the arrangement is such that by a swinging movement of said hanger an orbital movement is imparted to said pinion 24, with a corresponding addition to its speed of rotation over and above the speed imparted thereto by the rotation of the gear wheel 23 aforesaid. Such increased speed of rotation of the pinion 24 is in turn imparted to the film feeding sprocket drum 6, through the intermediate operative connections above described, and is intended to take place during the film feeding movement of said sprocket drum, with a view to reduce the time occupied in a movement of the film in each cycle of the film feeding mechanism.

The above mentioned swinging movement of the hanger 22 at the proper time is attained by the following arrangement of parts: 25 is a shaft journaled in the housing 1, and preferably in longitudinal alinement with the aforesaid countershaft 16, as shown. 26 is a pinion carried by said shaft and meshing with and driven by the gear wheel 23 aforesaid. 27 is a wheel or disk carried by the shaft 25 and formed with a cam groove 28 in one of its sides, as shown in Figs. 5 and 6. 29 is a cam arm having a stud or pin on one end engaging in the cam groove 28 aforesaid. Said cam arm has operative connection with the pendulous hanger 22, preferably by means of a carrying shaft 30 journaled in the housing 1 and carrying on its respective ends the hanger 22, and cam arm 29 as shown in Figs. 2, 5 and 6. As so arranged said shaft provides a journal bearing for the gear wheel 23 and its companion pinion 31, as shown.

With the above described mechanism for effecting a periodic acceleration in the speed of the film feeding mechanism, a variable tension or frictional retardation of the film is of advantage in order to prevent a tendency to tear the spaces between the sprocket perforations in the film in the beginning of the film movement, and to prevent a tendency on the part of the film to continue its movement after the sprocket wheel has stopped. To such ends the following coacting tension mechanism is provided. 32 are counterpart bearing strips arranged vertically at opposite sides of the light opening 4 in the hinged door 3 of the kinetoscope housing 1, and adapted to have limited movement to and from the inner surface of said door and the picture film passing between said parts in its movement through the apparatus. To such end said strips are suspended by their upper ends from vertical standards 33 on the carriage 7 aforesaid, and the connections are made by connecting pins 34 engaging in elongated slots 35 in the respective parts to attain the limited movement aforesaid in addition to the pendulous movement of said strips due to their overhead attachment. 36 are bearing lugs or studs secured to the strips 32 midway their height and adapted to form abutments for the spring fingers of the automatic operating mechanism now to be described. 37 is a revolving cam disk turning in unison with the driven member 10 of the intermittent gearing of the sprocket drum 6, and preferably formed as an integral part of said member as shown in Fig. 8. 38 is a frame pivoted on the carriage 7 and carrying at one end a roller 39 engaging the cam surface of the disk 37 aforesaid. 40 is a secondary frame pivoted to the carriage 7 and connected to the frame 38 by an adjusting screw 41 by which limited adjustment between the parts is effected in adjusting the tension of the spring fingers 42 carried by said secondary frame 40, and which fingers have bearing against the bearing lugs or studs 36, of bearing strips 32 aforesaid. With the described arrangement the cam disk 37 is adapted to impose the movements heretofore described in the attainment of the variations in the tension placed upon the picture film, and to such end the cam surface of the disk is formed and timed to impart the required oscillations to the frames 38 and 40, aforesaid.

Having thus fully described my said invention what I claim as new and desire to secure by Letters Patent, is:—

1. The combination of a main frame, a driving shaft journaled in said frame, a carriage having vertical adjustment in said frame, an intermittent film feeding mechanism mounted on said carriage, an operative connection between the driving shaft and the film feeding mechanism comprising in part an intermediate flexible and extensible shaft, and means for effecting a periodic acceleration in the rotation of said intermediate shaft, the same comprising in part a driving spur gear, a driven pinion in mesh therewith, a pendulous hanger carrying said pinion, and means for imparting periodic vibration to said hanger.

2. The combination of a main frame, a driving shaft journaled in said frame, a carriage having vertical adjustment in said frame, an intermittent film feeding mechanism mounted on said carriage, an operative connection between the driving shaft and the film feeding mechanism comprising in part an intermediate flexible and extensible shaft, and means for effecting a periodic acceleration in the rotation of said intermediate shaft, the same comprising a driving spur gear, a driven pinion in mesh therewith, a pendulous hanger carrying said pinion, a second driven pinion engaging said driving gear, a shaft carrying said pinion, a cam disk carried by said shaft, and a cam arm engaging said cam disk and operatively connected to said pendulous hanger.

3. The combination of a main frame, a driving shaft journaled in said frame, a carriage having vertical adjustment in said frame, an intermittent film feeding mechanism mounted on said carriage, an operative connection between the driving shaft and the film feeding mechanism comprising in part an intermediate flexible and extensible shaft, and means for effecting a periodic acceleration in the rotation of said intermediate shaft, the same comprising a driving spur gear, a driven pinion in mesh therewith, a pendulous hanger carrying said pinion, a second pinion arranged at the side of the aforesaid pinion and engaging said driving gear, a shaft carrying said second pinion, a cam disk carried by said shaft, and a cam arm engaging said cam disk and operatively connected to said pendulous hanger.

4. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips supported near the sides of the aperture in the film support, a cam disk turning in unison with the film feeding mechanism, and operative connections between said cam disk and the bearing strips, the same comprising in part a pair of spring fingers having bearing engaging against said strips.

5. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips supported near the sides of the aperture in the film support, a cam disk turning in unison with the film feeding mechanism, and operative connections between said cam disk and the bearing strips, the same comprising in part a pair of pivoted frames and an adjusting screw connecting the same.

6. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips suspended at their upper ends by standards on the aforesaid carriage and at the sides of the aperture in the film support, a cam disk turning in unison with the film feeding mechanism, and operative connections between said cam disk and the bearing strips.

7. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips supported near the sides of the aperture in the film support, a cam disk turning in unison with the film feeding mechanism, operative connections between said cam disk and the bearing strips, and means for effecting a periodic acceleration in the rotation of the intermediate shaft of the film feeding mechanism.

8. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips supported near the sides of the aperture in the film support, a cam disk turning in unison with the film feeding mechanism, operative connections between said cam disk and the bearing strips, the same comprising in part a pair of spring fingers having bearing engagement against said strips, and means for effecting a periodic acceleration in the rotation of the intermediate shaft of the film feeding mechanism.

9. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips supported near the sides of the aperture in the film support, a cam disk turning in unison with the film feeding mechanism, operative connections between said cam disk and the bearing strips, the same comprising in part a pair of pivoted frames and an adjusting screw connecting the same, and means for effecting a periodic acceleration in the rotation of the intermediate shaft of the film feeding mechanism.

10. The combination of a main frame, a driving shaft journaled in said frame, a carriage having a vertical adjustment in said frame, an intermittent film feeding mechanism mounted on said carriage, an operative connection between the driving shaft and the film feeding mechanism comprising in part an intermediate flexible and extensible shaft, an apertured film support, bearing strips suspended at their upper ends by vertical standards on the aforesaid carriage and at the sides of the aperture in the film support, a cam disk turning in unison with the film feeding mechanism, operative connections between said cam disk and the bearing strips, and means for effecting a periodic acceleration in the rotation of the intermediate shaft of the film feeding mechanism.

11. The combination of a main frame, a driving shaft journaled in said frame, an apertured film guiding door hinged to said frame, an intermittent film feeding mechanism mounted on said frame, counterpart bearing strips supported near the sides of the aperture in said door, a cam disk turning in unison with the film feeding mechanism, and operative connections between the cam disk and the bearing strips, the same comprising in part a pair of spring fingers having bearing engagement against said strips.

12. The combination of a main frame, a driving shaft journaled in said frame, an apertured film guiding door hinged to said frame, an intermittent film feeding mechanism mounted on said frame, counterpart bearing strips supported near the sides of the aperture in said door, a cam disk turning in unison with the film feeding mechanism, and operative connections between the cam disk and the bearing strips, the same comprising in part a pair of pivoted frames and an adjusting screw connecting the same.

Signed at Chicago, Illinois this 16th day of April 1909.

ALVAH C. ROEBUCK.

Witnesses:
ROBERT BURNS,
HENRY MOE.